Oct. 20, 1970  H. M. STANFIELD  3,534,978
CABINET RUNNING GEAR AND BRAKE MEANS THEREFOR
Filed Feb. 5, 1968  2 Sheets-Sheet 1
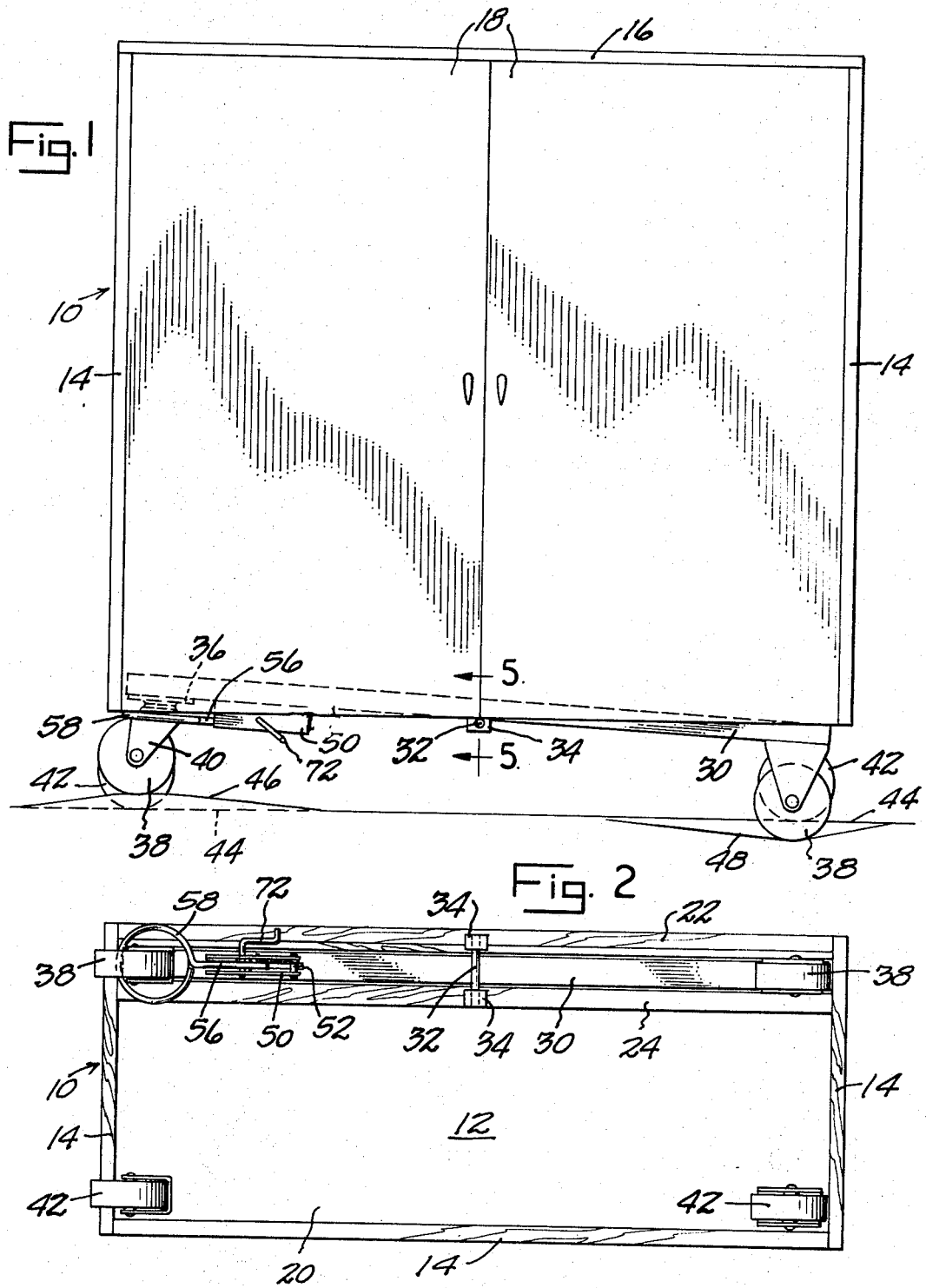
INVENTOR.
HERBERT M. STANFIELD
BY
ATTORNEY Oct. 20, 1970   H. M. STANFIELD   3,534,978
CABINET RUNNING GEAR AND BRAKE MEANS THEREFOR
Filed Feb. 5, 1968   2 Sheets-Sheet 2
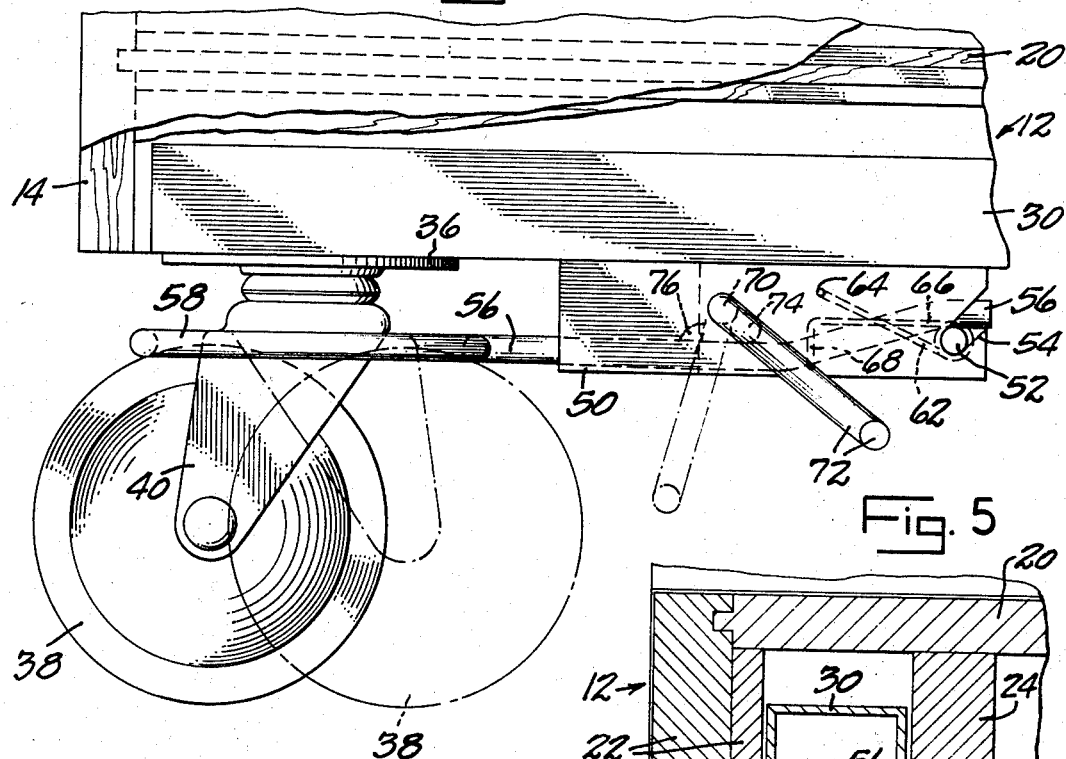
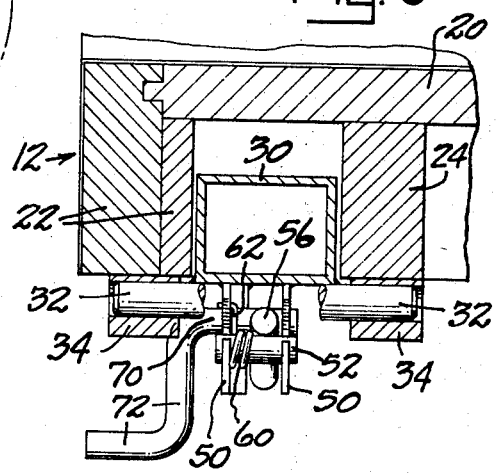
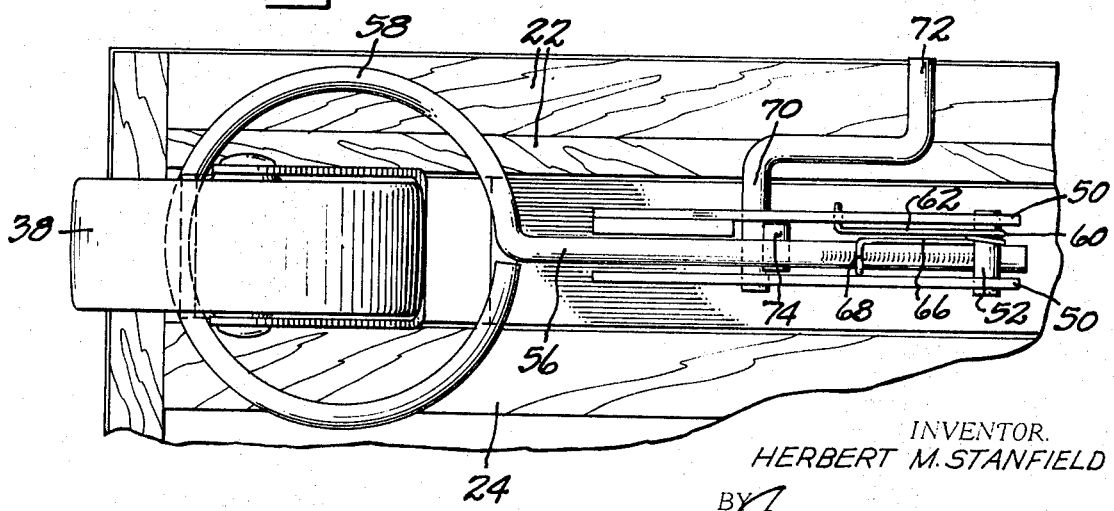
INVENTOR.
HERBERT M. STANFIELD
BY
ATTORNEY

United States Patent Office 3,534,978
Patented Oct. 20, 1970

3,534,978
CABINET RUNNING GEAR AND BRAKE MEANS THEREFOR
Herbert M. Stanfield, New Paris, Ind., assignor to Mutschler Brothers Co., Inc., Nappanee, Ind.
Filed Feb. 5, 1968, Ser. No. 702,940
Int. Cl. B62d *21/00;;* B60t *1/04*
U.S. Cl. 280—111    10 Claims

ABSTRACT OF THE DISCLOSURE

A running gear for supporting a cabinet or other article having a rigid base to which two wheel units are mounted directly at two corners. Two wheel units adjacent other corners of the base are carried by the end parts of an elongated rigid member pivoted at its center to the base. A wheel unit may have a brake member frictionally engageable therewith spaced from the wheel support. The brake member is spring urged to release position and is actuated by means acting against said spring.

---

This invention relates to improvements in cabinet running gears.

It is frequently desirable to provide storage cabinets of different types and other items, such as furniture, with running gear consisting of wheels mounting the same and accommodating rolling of the cabinet from place to place, and at the same time to provide means by which the cabinet may be held at a selected location against movement from that selected location. Frequently, the floor level at a selected location may not be true. In such cases it has been necessary heretofore to provide shims by which the cabinet may be supported firmly and solidly. Use of such shims means is time consuming, the shims are frequently displaced and must be replaced often, and stresses may be applied to the cabinet which tend to wrack or distort the same. Also, in cases where the cabinet is supported upon caster wheels it has been difficult to provide means by which the cabinet can be positioned at a selected location and held thereat against undesired or unintentional displacement.

It is the primary object of this invention to provide a running gear for a cabinet or like article having supporting wheels at four corners thereof, wherein two of said wheels have a fixed supporting relation to the cabinet and the other wheels are mounted upon a cross bar which is centrally pivoted to the cabinet so that said cabinet may be supported by all wheels and assumes a position determined by the character of the floor or supporting surface engaged by the two first named wheels.

A further object is to provide a device of this character supported by caster wheels and having novel selectively operable means for applying frictional pressure to a caster wheel in a manner to retain the same against movement from a selected position.

A further object is to provide a novel and simple and inexpensive running gear for cabinets and other objects which will firmly and solidly support the cabinet upon an uneven floor or surface and will retain the same at a selected position regardless of the attitude of caster wheels forming part of said running gear.

Other objects will be apparent from the following specification.

In the drawings:

FIG. 1 is a front elevational view of a cabinet provided with my new running gear.

FIG. 2 is a bottom plan view of a cabinet illustrating the running gear.

FIG. 3 is an enlarged fragmentary detail side elevational view with parts broken away and illustrating the running gear.

FIG. 4 is a fragmentary bottom plan view showing the parts illustrated in FIG. 3.

FIG. 5 is a fragmentary vertical transverse sectional view taken on line 5—5 of FIG. 1.

The invention has primary utility for application to storage cabinets and is illustrated and described herein as applied to a storage cabinet. However, the invention is equally applicable to any rigid article which is to be moved from place to place, such as an article of furniture, a machine, a table or bench, or the like.

The running gear entails the use of two wheeled supports, such as casters, which are mounted fixedly to the article to be supported at two spaced corners thereof, and two other wheeled supports located at the other two corners of the supported article and mounted upon a long member which is pivoted at its center to the article to be supported. The arrangement is such that all four wheels can contact the supporting surface regardless of irregularities in that surface, thereby providing a firm and solid support for the article. The article may be held in any selected position, regardless of the attitude of the wheels which support it, by selectively operable braking means frictionally engaging a wheel so as to resist rotation thereof.

In the drawing, the numeral 10 designates a cabinet or other rigid unit or article having a rigid base structure 12. An upper structure is supported on base 12 which structure, in the form shown, may include vertical side and rear walls 14, a top 16 and front members 18, such as doors. The base structure 12 preferably supports a bottom panel 20 which is preferably located at a level spaced above the lowermost edges of the base structure. At one margin of the rigid base structure, preferably at the front thereof, the structure includes spaced parallel rigid members 22 and 24 which span the base structure and cooperate therewith and with the bottom panel 20 to define an inverted channel as best seen in FIGS. 2 and 5.

An elongated rigid member 30, here shown as a metal tube but which may be of any type or shape desired, fits snugly and shiftably within the channel defined between the members 22 and 24. At its central portion the elongated rigid member 30 has secured thereto a transverse pivot pin 32 which preferably projects laterally therefrom at the bottom thereof with its ends rotatable in journal members 30 which are fixedly secured to the members 22 and 24. The arrangement is such that the elongated member 30 is free to pivot in the space between the members 22 and 24 through a predetermined angular range determined by the vertical clearance between the member 30 and the bottom panel 20.

At the outer ends of the member 30 are secured wheel supports, such as the mounting plates 36 of swivel casters. Each caster includes a caster wheel 38 journaled in a caster fork 40 which is swiveled about a vertical axis to the mounting plate 36. The caster wheel may be of any type or construction desired. It will be seen that the caster wheels 40 are positioned adjacent to the two front corners of the cabinet or other supported article. The support of the article 10 is completed by the fixed mounting or connection to the article, as at the remaining two corners, other support wheels 42, which may also be caster wheels.

The running gear as described above provides assured and uniform four point support for the cabinet or other supported article regardless of irregularities of the floor or other supporting surface from a true or flat plane. Thus it will be seen in FIG. 1 that the lateral attitude of the supported article will be determined by the nature of the surface engaged by the fixedly connected supporting wheels 42. This lateral attitude is accommodated by the pivotal mounting of the rigid member 30 to the supported article so that it can assume a tilted or inclined position in the event the surfaces engaged by the wheels 38 are at different elevations or in a different plane than the surfaces engaged by the wheels 42. This is illustrated in FIG. 1 wherein the wheels 42 are shown as being supported at a plane 44 while the left wheel 38 is elevated by engagement with a raised surface portion 46 and the right hand wheel 38 is supported in a depressed surface part 48. The fore and aft attitude of the supported article is determined by the vertical position of the pivot pin 32, which in turn is determined by the differences or the inclination in elevation of the two surfaces 46 and 48 relative to the surface 44 at which the wheels 42 are supported. In most cases, such as shown in FIG. 1, there is only negligible fore and aft inclination of the supported article due to the averaging action of the pivoted member 30 responsive to the vertical deviations of surfaces 46 and 48 relative to surface 44.

It is frequently desirable to provide releasable means by which the rotation of the wheels of supported articles may be braked to insure that the article supported thereby will maintain a selected position. This can be accomplished by the mechanism best illustrated in FIGS. 3–5 hereof. It will be understood that while this mechanism has been illustrated as applied to the caster wheel mounted upon a pivoted bar 30 it is equally applicable to caster wheels whose mounting plates are fixedly secured to an article to be supported and to non-swiveling wheels.

In this construction two spaced elongated plates 50 are secured to the supported article, being here shown as being secured to and extending longitudinally of and projecting below the rigid elongated member 30. The plates 50 are provided with aligned openings within which are journaled or rockable the opposed projecting ends of a pivot pin 52. In the form illustrated in FIG. 3 the ends of the plates 50 have inclined slots 54 removably receiving the ends of pivot pin 52, but such a construction is optional. The pivot pin 52 is secured to one end of elongated member 56 such as a stiff spring wire. Member 56 extends between the plates 50 and terminates in a horizontal braking part such as a loop or ring or annular portion 58. The braking portion 58 encircles the upper part of the caster fork or other whel journaling part 40 above the wheel 38 and is substantially concentric with the axis of swivel of the swivel fork 40 relative to the mounting plate 36. The inner diameter of the annular portion 58 is greater than the circular path of the outermost portion of the caster 40 during rotation, so that contact between the annular braking portion 58 and the caster is limited to engagement thereof with an upper part of the caster wheel 38 spaced from the caster fork 40.

The member 56, 58 may be positioned clear of the wheel 38 to permit free rotation of the article-supporting wheels when it is desired to move the cabinet or other article 10 from place to place. I prefer to utilize spring means for normally releasably positioning member 56, 58 so that part 58 thereof is clear of the wheel 38. As here illustrated, the positioning means may constitute a spring wire having a loop 60 intermediate its ends encircling the pivot pin 52. One arm or end portion 62 of the spring is preferably anchored to a plate 50 as illustrated at 64. The other arm or end portion 66 of the spring terminates in a hook or loop portion 68 which engages and supports the elongated member 56 spaced from the pivot pin 52. In the normal position of the spring 60, 62, 66 it acts to hold the braking portion 58 clear of the wheel 38 to accommodate free rolling of the wheel.

Means are provided for depressing the elongated member 56 and its braking portion 58 into braking engagement with wheel 38 against the action of the spring 60, 62, 66. As here shown, such depressing means constitute a crank having a crank pin 70 which is journaled in openings formed in plates 50 spaced above the normal position of the elongated member 56 and spaced lengthwise relative to the pivot pin 52 and the spring hook portion 68. The crank includes a crank handle 72 extending below the plates 50 and the article supported by the running gear and readily accessible for manual manipulation as required, as by extension thereof below the front of the rigid base structure 12. The crank pin 70 carries a cam part 74 which is engageable with the member 56.

The parts are so proportioned that the crank arm 72 is normally held in an inclined position as illustrated in FIG. 3 with the cam 74 resting on an intermediate part of the elongated member 56 which in turn is positioned or supported by the hook portion 68 of the spring 62, 66. An abutment 76 which may be carried by member 56 or by plate 50 is engageable by the crank cam 74 or other crank part when the crank has been swung from normal position shown in full lines in FIG. 1 to and past lower dead center position. It will be understood that any stop means which will limit the crank movement at a lowered position and depress the member 56 may be utilized. The downstroke of a cam 74 upon movement of the crank arm is sufficient to firmly press the braking member 58 downwardly against the top of the wheel 38 and thereby apply a braking action which prevents free rotation of the wheel. The amount of braking pressure applied will depend in part upon the stroke of the cam 74. It will be observed that in the application of the braking device to a swiveled or caster wheel, the brake will be effective regardless of the angular swiveled position assumed by the caster wheel because of the concentric relation of the annular braking portion 58 to the caster swivel axis.

While the preferred embodiment of the invention has been illustrated and described it will be understood that changes in the construction may be made without departing from the spirit of the invention.

I claim:
1. In combination,
an article having a rigid base structure including two spaced marginal portions,
two spaced members supporting said article, each connected to an end part of one marginal portion of said base structure,
a rigid elongated member extending lengthwise of and having clearance with the other marginal portion of said base structure and having a central part pivotally connected to said base structure intermediate the length of said other marginal portion of said base structure on a predetermined transverse substantially horizontal axis so as to be shiftable in a substantially vertical plane only, and
a pair of spaced members each supporting an end of said elongated pivoted member.

2. The combination defined in claim 1, wherein said first named support members are located at the rear of said article and said elongated pivoted member is located at the front of said article.

3. The combination defined in claim 1, wherein said other marginal portion includes an elongated channel portion open at its bottom and shiftably receiving said elongated pivoted member.

4. The combination defined in claim 1, wherein
said second named support members are wheels and a braking member is shiftably carried by said elongated pivoted member and engageable with a wheel, and
selectively operable means for pressing said braking member into frictional braking engagement with said wheel.

5. The combination defined in claim 1, wherein said second named support members are wheels and a braking member is shiftably carried by said article adjacent a wheel and selectively pressed into frictional engagement with the periphery of said wheel.

6. In combination,
a caster including a horizontal mounting plate and a wheel unit swiveled to said plate on a vertical axis and journaling a wheel on a horizontal axis, an article supported by said caster, and a brake unit associated with said caster only including an elongated member pivotally carried by said supported article and having a part movable relative to said horizontal mounting plate and engaging an upper portion of said wheel in all swiveled positions thereof to resist rotation thereof.

7. The combination defined in claim 6, wherein said wheel engaging part is annular and is concentric with the vertical swivel axis of said wheel unit.

8. The combination defined in claim 6, and selectively operable means carried by said article for applying wheel braking pressure to said wheel-engaging part.

9. The combination defined in claim 6, and resilient means for normally positioning said brake unit in released position, and selectively operable means for shifting said brake unit to braking position against the action of said resilient means.

10. The combination defined in claim 6, wherein the elongated member of said brake unit is resilient and is pivoted on a horizontal axis to said article spaced from said caster, spring means are carried by said article to normally position said brake unit in released position, and a brake actuator is pivoted to said article and includes a cam part engaging said elongated member and shiftable between a released position and an operative position flexing said elongated member to cause said elongated member to engage said wheel.

References Cited

UNITED STATES PATENTS

| | | | |
|---|---|---|---|
| 1,520,941 | 12/1924 | Funk | 188—21 |
| 1,116,086 | 11/1914 | Lewis | 16—35 X |
| 3,222,021 | 12/1965 | Sisler | 248—188.3 |
| 2,316,374 | 4/1943 | Townsend | 280—111 |
| 782,348 | 2/1905 | Livengood | 280—126 |

FOREIGN PATENTS 204,215   7/1959   Germany.

GEORGE E. A. HALVOSA, Primary Examiner

U.S. Cl. X.R.

16—35; 188—1, 29; 248—188.2, 382; 312—327